P. C. POST.
Road-Scrapers.

No. 153,607.  Patented July 28, 1874.

WITNESSES:

INVENTOR:
P. C. Post
BY
ATTORNEYS.

UNITED STATES PATENT OFFICE.

PETER C. POST, OF PATERSON, NEW JERSEY.

IMPROVEMENT IN ROAD-SCRAPERS.

Specification forming part of Letters Patent No. 153,607, dated July 28, 1874; application filed May 23, 1874.

*To all whom it may concern:*

Be it known that I, PETER C. POST, of Paterson, in the county of Passaic and State of New Jersey, have invented a new and Improved Road-Scraper, of which the following is a specification:

My invention consists of two scraping-blades arranged for scraping the earth together in a ridge, pivoted at the middle to draft-bars, and connected at the front end by chains to said bars; also, connected together at the rear by chains, and the draft-bars connected together by an adjustable bar, all so that the scrapers can be adjusted to certain different conditions adapted for different conditions of the road, and for producing different effects by more simple and inexpensive means than have been employed heretofore in scrapers of this character.

Figure 1:
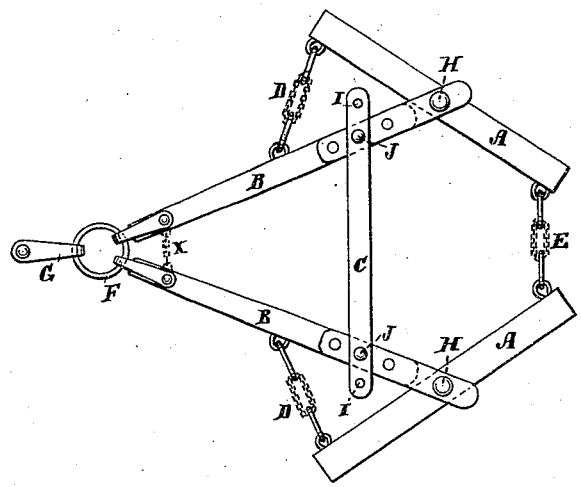
Figure 2:
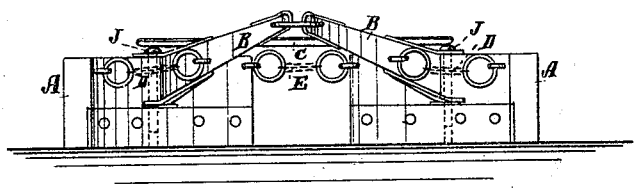

Figure 1 is a plan view of my improved road-scraper. Fig. 2 is a front elevation.

Similar letters of reference indicate corresponding parts.

A represents the scraping-blades; B, the draft-bars; C, the adjustable cross-bar connecting the draft-bars; D, chains connecting the scrapers to the draft-bars at the forward end; E, a chain connecting the scrapers together at the hind end; and F, a ring connecting the draft-bars together at the front end; and G, a clevis for connecting the scraper to the front axle of a wagon for working it.

The scrapers are pivoted to the draft-bars at H, so as to turn on their pivots to allow of adjusting them wider apart or closer together at either end, and the chains D and E are provided for so adjusting them, while the bar C is for shifting them to or from each other in all parts.

In practice the chains will be made of sufficient length, and provided with hooks for shortening and lengthening the connection at will.

The connecting-bar C has two or more holes, I, near each end for the fastening-bolts J, which are fitted to screw in and out at will to adjust the blades toward and from each other for widening or narrowing the scraper.

This scraper is designed for scraping the earth from the gutters along the side up to the middle portion, for rounding up the road-bed. By its arrangement for adjusting the angle of the blades and the width it is rendered more capable of adaptation to the varying conditions of the work than it could be without such arrangement; and the arrangement of means for effecting the different adjustments is very simple and cheap, rendering it less expensive in first cost and in repairs, and more easy to adjust than other scrapers as they have been constructed.

Having thus described my invention, I claim as new and desire to secure by Letters Patent—

1. The blades A pivoted at the middle to the draw-bars B, connected together at the rear end by the chain E, and connected to the draw-bars at the front end by chains D, substantially as specified.

2. The combination of adjustable draw-bars B, adjustable cross-bar C, and adjustable scrapers A, substantially as specified.

PETER C. POST.

Witnesses:
CORNELIUS DOREMUS,
W. OAKLEY ROOT.